United States Patent [19]

Van Etten

[11] Patent Number: 4,490,829
[45] Date of Patent: Dec. 25, 1984

[54] DETECTION OF ANGULAR MODULATED ELECTROMAGNETIC SIGNALS

[75] Inventor: Paul Van Etten, Clinton, N.Y.

[73] Assignee: The United States of America as represented by the Secretary of the Air Force, Washington, D.C.

[21] Appl. No.: 445,646

[22] Filed: Nov. 30, 1982

[51] Int. Cl.³ ............................................. H04K 1/04
[52] U.S. Cl. ......................................... 375/1; 375/115
[58] Field of Search ................. 375/1, 115, 2, 43, 80, 375/81, 100, 102; 343/5 PN; 370/107

[56] References Cited

U.S. PATENT DOCUMENTS

| | | | |
|---|---|---|---|
| 3,112,452 | 11/1963 | Kirkpatrick | 328/167 |
| 3,412,405 | 11/1968 | Crotty et al. | 343/777 |
| 4,119,926 | 10/1978 | Frosch et al. | 375/115 |
| 4,221,005 | 9/1980 | La Flame | 375/1 |
| 4,285,060 | 8/1981 | Cobb et al. | 375/1 |
| 4,308,539 | 12/1981 | Birch | 343/100 |
| 4,392,231 | 7/1983 | Henry | 375/1 |

Primary Examiner—Robert L. Griffin
Assistant Examiner—Stephen Chin
Attorney, Agent, or Firm—Donald J. Singer; Bernard E. Franz

[57] ABSTRACT

A signal processing circuit which operates on a spread spectrum received signal to compress it into a waveform of sufficient amplitude to allow detection by conventional means. The received signal is filtered and split onto two paths, each path being mixed with an upper or lower single sideband created by an oscillator and modulator combination. The output of each mixer is filtered and mixed together in a third mixer, the resultant output of which is fed through a narrow bandpass filter to a conventional signal detector.

6 Claims, 3 Drawing Figures

DETECTION OF ANGULAR MODULATED ELECTROMAGNETIC SIGNALS

RIGHTS OF THE GOVERNMENT

The invention described herein may be manufactured and used by or for the Government of the United States for all governmental purposes without the payment of any royalty.

BACKGROUND OF THE INVENTION

The present invention relates to signal processing circuits in general, and, more particularly to signal processing circuits for removing angular modulation.

In many electronic systems, such as in radar and communications, angular modulation is employed to produce broadband spectrums. Pulse compression and spread-spectrum techniques are employed to spread the electromagnetic intelligence over a very large spectrum bandwidth with very little signal amplitude. If the electromagnetic energy is expanded over a very large spectrum such that it falls below the environment or receiver's noise, the information contained on the signal cannot normally be obtained. Employment of these waveforms in a system is generally referred to as a low probability of intercept system. Direction finding and location of electromagnetic emitters by electromagnetic intelligence gathering systems is denied by such low probability of intercept techniques. However, if the electromagnetic energy could be compressed into a narrow bandwidth with an enhanced signal-to-noise ratio, detection of such a signal can be performed.

Prior work in this area includes U.S. Pat. No. 3,112,452 by Kirkpatrick which discloses a signal processing arrangement in which a signal is fed to a broadband amplifier and through a plurality of filters to an adder and thence through a narrow band filter. While the patent is suitable for its intended purpose, it does not perform signal processing in the same manner as the present invention.

SUMMARY OF THE INVENTION

It is therefore an object of the invention to provide a signal processing circuit for compressing the electromagnetic energy normally found in a spread-spectrum bandwidth signal into a narrow bandwidth signal, thereby making detection of the narrow bandwidth signal easier to perform.

According to the invention, the filtered received signal is split onto two paths, the signal on each path is then mixed with an upper or lower single sideband signal, with the filtered output of each mixer being mixed with each other to produce an output signal which can be filtered and fed to a conventional detector. The single sideband signals are produced from a pair of oscillators, coupled to two single sideband modulators, to produce the sum component of the two oscillators and the difference component. The sum and difference component signals are, respectively, the signals for the two path mixers. The output of each path mixer is filtered using a wide bandpass filter while the output of the third mixer is filtered using a narrow bandpass filter.

DETAILED DESCRIPTION OF THE INVENTION

Figures 1, 2, 3:
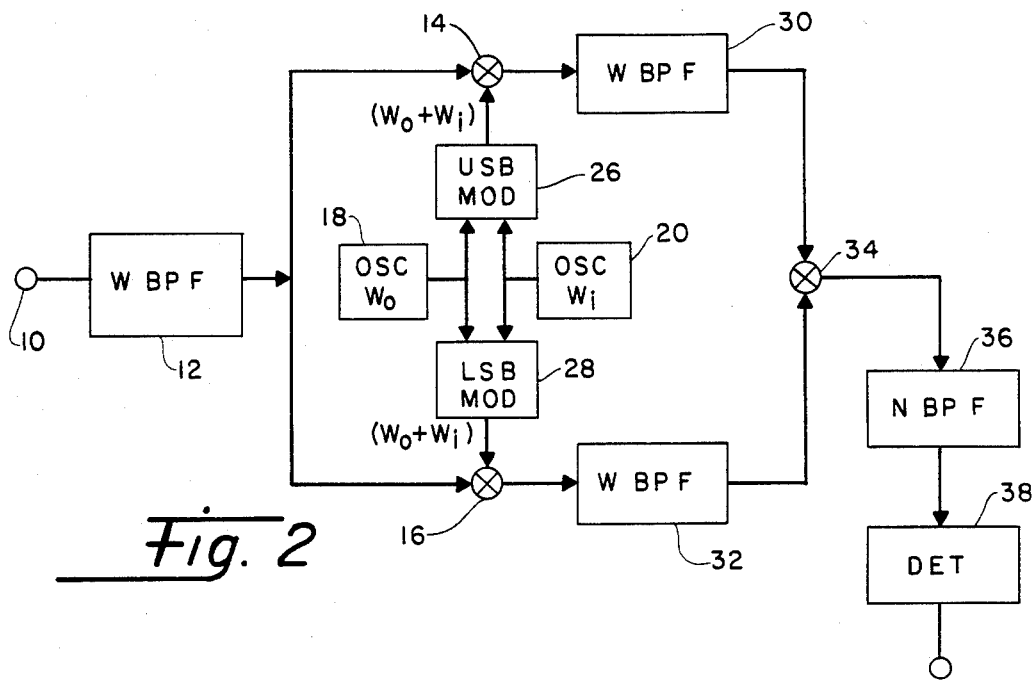
FIG. 1 is a graphical representation of an input signal to the subject invention illustrating the spread-spectrum waveform.
FIG. 2 is a block diagram of the preferred embodiment of the invention.
FIG. 3 is a graphical representation of an output signal from the subject invention illustrating the compressed spectrum waveform.

The present invention describes a technique for the detection and removal of angular modulation from a received electromagnetic signal. Angular modulation includes both frequency and phase modulated carriers. The technique involves compressing received electromagnetic energy into a narrow bandwidth as described herein. Let us consider a received signal waveform of the form:

$$S_1(t) = a(t) \sin[(w_o + \Delta)t + \phi(t)] \quad (1)$$

where:
- $S_1(t)$ = received signal
- $a(t)$ = amplitude modulation
- $w_o$ = assumed carrier frequency (your listening frequency)
- $\phi(t)$ = angular modulation (i.e. either phase or frequency modulation)
- $\Delta$ = a frequency offset of the carrier (this will be used later to show that the exact received signal's carrier frequency need not be known)

This signal, of general form, may be, for example a linear frequency modulated pulse or a poly-phase modulated pulse and is illustrated in FIG. 1.

Referring to FIG. 2, the received signal described by the above equation has been properly amplified and is identified as a source of received input signals 10. The signal is fed through a wide bandpass filter 12 which is selected based upon the range of interest. If, for example, it is desired to listen to the S-Band frequency range (2 to 4 GHz), filter 12 is selected to have a bandpass response from 2 to 4 GHz. Following the filter, the signal is split into two separate signals, each of which is fed as inputs to two separate and independent mixers 14 and 16. The splitting device is any conventional RF splitting apparatus, such as a magic-T.

Also shown in FIG. 2 are two oscillators 18 and 20, in which oscillator 16 produces a frequency $w_o$ which coincides with the listening frequency of interest and oscillator 20 produces a frequency $w_i$ which is a frequency higher than the bandwidth of the listening frequency and together they produce two new frequencies, $(w_o + w_i)$ and $(w_o - w_i)$. Following the earlier example, one may choose $w_o = 3$ GHz and $w_i = 100$ MHz. One method of obtaining the sum and difference frequencies is through the use of single-sideband modulators, 26 and 28. An output from each oscillator is fed to both an upper band single-sideband modulator 26 and a lower band single-sideband modulator 28 which in turn operates to produce the sum and difference frequencies $w_o \pm w_i$, respectively. The sum frequency $w_o + w_i$ is fed to a mixer 14, which combines it with the signal from filter 12 to produce an output signal $S_{14}$ and will be the product:

$$S_{14}(t) = \{a(t) \ \text{Sin}[(W_o+\Delta)t+\phi(t)]\}\{\text{Sin}(W_o+W_i)t\} \qquad (2)$$

Still another technique to obtain the sum and difference frequencies ($w_o+w_i$ and $w_o-w_i$) is as follows: The oscillators 18 and 20 with frequencies of $w_o$ and $w_i$, each feed a mixer whereas the output of the mixer is branched to two narrow bandpass filters. The center frequency of one filter is tuned to the frequency $w_o+w_i$ and the other is tuned to $w_o-w_i$. The filter outputs then feed the mixers 14 and 16, as did the first technique described above.

Signal $S_{14}$ is then fed through a wide bandpass filter 30 that has a response centered at the sum of the two mixer input frequencies such that the output at filter 30 is:

$$S_{30}(t) = a(t) \ \text{Cos} \ [(w_i-\Delta)t-\phi(t)] \qquad (3)$$

The difference frequency $w_o-w_i$ produced by modulator 28 is fed to mixer 16 which combines it with the signal from filter 12 to produce an output signal $S_{16}$ of the form:

$$S_{16}(t) = \{a(t) \ \text{Sin}[(w_o+\Delta)t+\phi(t)]\} \ \{\text{Sin} \ (w_o-w_i)t\} \qquad (4)$$

Signal $S_{16}$ is then passed through a wide bandpass filter 32 which is centered at the difference of the two mixer input frequencies, such that the output signal of filter 32 is:

$$S_{32}(t) = a(t) \ \text{Cos} \ [(w_i+\Delta)t+\phi(t)] \qquad (5)$$

The signals $S_{32}$ and $S_{30}$ from filters 32 and 30 are then mixed in a mixer 34 with the output fed through a narrow bandpass filter 36 which is centered at the sum frequency, giving an output signal of:

$$S_{36}(t) = a^2(t) \ \text{Sin} \ [2w_it] \qquad (6)$$

From the above equation, it can be observed that both the angular modulation term ($\phi(t)$) and the frequency offset term ($\Delta$) have dropped out. This equation substantiates that the circuitry removes angular modulation from the received electromagnetic input signal. The $\Delta$ frequency term was employed mathematically to show that if any signal is in the 2 to 4 GHz band, the signal appearing at the output of filter 36 will always be centered at a frequency of $2w_i$. The graphical representation of the above output equation can be seen in FIG. 3 and can be compared with the original received input signal shown in FIG. 1.

The final operation is to pass output signal $S_{36}$ through a conventional amplitude detector 38 to arrive at a detected output signal:

$$S_{38} = a^2(t)$$

From the above equation, it can be seen that the signal processing circuit of the present invention combined with conventional amplitude detection techniques produces an output signal which is the square of the amplitude modulation with frequency or phase modulation removed. By choosing the proper bandpasses of filter 12, 30, 32, and 36, the receiver's signal-to-noise ratio can be optimized. To illustrate this, consider the example of a linear frequency modulated waveform where:

$$\phi(t) = \frac{\mu}{2} t^2 \qquad (8)$$

and $$a(t) = 1, |t| < \frac{T}{2}$$

$a(t) = 0$, elsewhere
denoted as:

$$a(t) = \text{Rect T} \qquad (9)$$

where
  t = time
  T = radiated pulse width (time)
  $\mu$ = a constant (the frequency slope of the dispersive waveform which is the bandwidth divided by the pulse width)
then $$S_1(t) = \text{Rect } T \ \text{Sin}\left[(w_o+\Delta)t+\frac{\mu}{2}t^2\right] \qquad (10)$$

From equation No. 6, the output of filter 36 is:

$$S_{36}(t) = \text{Rect T Sin } [2w_it] \qquad (11)$$

For the values of a long dispersived pulse, T = 200 microseconds and a bandwidth of 50 MHz, the time-bandwidth product, TB, equals 10,000. The spectrum of this waveform is spread uniformly over 50 MHz as shown in FIG. 1. When the chirp pulse is passed through the circuit of FIG. 2, the frequency modulation is stripped off and the resultant signal at the output of mixer 34 has a carrier frequency of $2w_i$. The spectrum of this waveform is shown in FIG. 3. Note that the spectrum has collapsed by a factor of 10,000 which is the time-bandwidth product of the original waveform. If one is interested in detecting this particular waveform, filter 36 will have a bandwidth of approximately 5 kHz whereas the noise power from the receiver will be less than that of a 50 MHz bandpass filter. Following filter 36, the waveform is detected in detector 38 and a video filter (not shown) of 2.5 kHz may be employed. The bandwidth reduction obtained from this technique may be useful if it is desired to record or store the signals being observed.

Still another useful feature of the detector is listening to a pulsed emitter that is frequency hopping (sometimes referred to as frequency agility). As an emitter changes frequency from pulse-to-pulse, the frequency output at mixer 34 will remain constant and no tuning is required. It is noted that the FIG. 2 circuitry will perform properly with both frequency agility and angular modulated waveforms.

Thus, while preferred constructional features of the invention are embodied in the structure illustrated herein, it is to be understood that changes and variations may be made by the skilled in the art without departing from the spirit and scope of the invention.

I claim:
1. A signal processing circuit for detecting spread spectrum radio frequency signals at a predetermined output frequency comprising:
  a source of spread spectrum radio frequency signals;

means for splitting said signals into first and second part signals on first and second paths, respectively;

first local oscillator means for generating a radio frequency output signal of frequency equaling the center frequency of said spread spectrum signals;

second local oscillator means for generating a radio frequency output signal of frequency one-half said predetermined output signal center frequency;

first single sideband modulator means connected with said first and second local oscillator means for generating from said first and second local oscillator means outputs, a summation frequency output signal;

second single sideband modulator means connected with said first and second local oscillator means for generating from said first and second local oscillator means outputs, a difference frequency output signal;

first mixer means for mixing said first part signal and said summation frequency signal to form a first mixer output signal;

second mixer means for mixing said second part signal and said difference frequency signal to form a second mixer output signal; and third mixer means for mixing said first and second mixer output signals to form a resultant output signal at said predetermined center frequency.

2. The processing circuit of claim 1 further including first and second wide bandpass filters located between said first and third and between said second and third mixer means respectively and tuned, respectively, to the sum frequency of the two input signals of said second mixer means and to the difference frequency of the two input signals of said second mixer means.

3. The signal processing circuit of claim 2 further including angular modulation detection means coupled with said resultant output of said third mixer means.

4. A method of compressing the bandwidth of a spread spectrum radio frequency signal of center frequency $f_i$ into a narrower spectrum output signal of center radio frequency $f_o$ comprising the steps of:

generating first and second local oscillator signals of radio frequencies $f_i$ and one-half $f_o$, respectively;

combining said first local oscillator signal with said second local oscillator signal to form first and second combination signals;

extracting the upper sideband component from said first combination signal and the lower sideband component from said second combination signal;

mixing said upper sideband component with said spread spectrum input signal and said lower sideband component with said spread spectrum input signal to form an upper intermediate signal and a lower intermediate signal, respectively;

blending said upper intermediate signal with said lower intermediate signal in a mixer to form a radio frequency output signal which includes a narrow band component of center frequency $f_o$; and extracting said narrow band $f_o$ centered radio frequency component from said output signal.

5. The method of claim 4 further including the steps of:

filtering said upper intermediate signal using a wide bandpass centered at the difference of said upper sideband component and said spread spectrum input signal prior to said blending step; and suppressing all but a wide bandpass component centered at the difference of said lower sideband component and said spread spectrum input signal from said lower intermediate signal prior to said blending step.

6. Signal bandwidth compression apparatus for detecting spread spectrum angular modulation signals of center frequency $f_i$ comprising:

means for generating first and second local oscillator signals of radio frequencies $f_i$ and one-half $f_o$, respectively;

single sideband combining means for combining said first and second local oscillator signals into an upper sideband combination signal and a lower sideband combination signal;

wide bandpass input filtering means for removing signals outside a predetermined band from the input signal of said apparatus;

first mixing means for mixing said upper sideband combination signal with said spread spectrum filtered input signal to form a first internal signal;

first wide bandpass filtering means for extracting from said first internal signal a sideband component having a response centered at the sum of said upper bandpass and said spread spectrum signals to form a filtered first internal signal;

second mixing means for mixing said lower sideband combination signal with said spread spectrum input signal to form a second interval signal;

second wide bandpass filtering means for extracting from said second internal signal a wideband component having a response centered at the difference of said lower bandpass and said spread spectrum signals to form a filtered second internal signal;

third mixing means for mixing said filtered first and second internal signals;

narrow bandpass filtering means centered at the sum of said filtered first and second internal signals for extracting an $f_o$ centered component therefrom; and amplitude modulation detection means for detecting the amplitude modulation component of said $f_o$ centered component.

* * * * *

UNITED STATES PATENT AND TRADEMARK OFFICE
CERTIFICATE OF CORRECTION

PATENT NO. : 4,490,829
DATED : 25 Dec 84
INVENTOR(S) : Paul Van Etten

It is certified that error appears in the above—identified patent and that said Letters Patent is hereby corrected as shown below:

At column 5 line 32 of the patent (in claim 2) the word "second" should read "first". Line 32 should therefore read "Sum frequency of the two input signals of said first".

Signed and Sealed this

Seventh Day of May 1985

[SEAL]

Attest:

DONALD J. QUIGG

Attesting Officer     Acting Commissioner of Patents and Trademarks